United States Patent
Savalle et al.

(10) Patent No.: US 12,463,893 B2
(45) Date of Patent: Nov. 4, 2025

(54) AVOIDING USER EXPERIENCE DISRUPTIONS USING CONTEXTUAL MULTI-ARMED BANDITS

(71) Applicant: Cisco Technology, Inc., San Jose, CA (US)

(72) Inventors: Pierre-André Savalle, Rueil-Malmaison (FR); Jean-Philippe Vasseur, Saint Martin d'Uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 17/389,823

(22) Filed: Jul. 30, 2021

(65) Prior Publication Data

US 2023/0035691 A1     Feb. 2, 2023

(51) Int. Cl.
*H04L 45/00*     (2022.01)
*H04L 45/02*     (2022.01)

(52) U.S. Cl.
CPC .............. *H04L 45/22* (2013.01); *H04L 45/08* (2013.01)

(58) Field of Classification Search
CPC ................................. H04L 45/22; H04L 45/08
See application file for complete search history.

(56) References Cited

U.S. PATENT DOCUMENTS

| | | | |
|---|---|---|---|
| 10,892,964 B2 | 1/2021 | Sharma et al. | |
| 2017/0347308 A1* | 11/2017 | Chou | H04L 43/08 |
| 2019/0342219 A1* | 11/2019 | Liu | H04L 43/20 |
| 2019/0379592 A1* | 12/2019 | Samadi | H04L 43/0852 |
| 2020/0028786 A1* | 1/2020 | Chachmon | H04L 45/24 |
| 2021/0044530 A1* | 2/2021 | Dhanabalan | H04L 47/20 |
| 2021/0099378 A1 | 4/2021 | Alaettinoglu et al. | |

(Continued)

FOREIGN PATENT DOCUMENTS

CN         111988225 A      11/2020

OTHER PUBLICATIONS

MuMAB: A multi-armed bandit model for wireless network selection, https://www.mdpi.com/1999-4893/11/2/13, published Jan. 26, 2018 (Year: 2018).*

(Continued)

*Primary Examiner* — Ivan O Latorre
(74) *Attorney, Agent, or Firm* — Lee & Hayes, P.C.; James M. Behmke (57) ABSTRACT

In one embodiment, a device uses a multi-armed bandit model to select different network paths over time via which traffic associated with an online application is routed. The device obtains, from a provider of the online application, application experience metrics associated with the different network paths and indicative of user satisfaction with the online application. The device learns, by the multi-armed bandit model, which of the different network paths will provide satisfactory application experience metrics, based on the application experience metrics associated with the different network paths. The device causes the traffic associated with the online application to be routed via a set of one or more paths expected by the multi-armed bandit model to provide satisfactory application experience metrics for the online application.

16 Claims, 9 Drawing Sheets

(56) References Cited

U.S. PATENT DOCUMENTS

| | | | |
|---|---|---|---|
| 2021/0126870 A1* | 4/2021 | Thiel | H04L 47/12 |
| 2021/0142196 A1 | 5/2021 | R et al. | |
| 2021/0211347 A1 | 7/2021 | Vasseur et al. | |
| 2021/0344587 A1* | 11/2021 | Ahmed | H04L 43/10 |
| 2022/0255839 A1* | 8/2022 | Dhanabalan | H04L 63/20 |

OTHER PUBLICATIONS

A Contextual Bi-armed Bandit Approach for MPTCP Path Management in Heterogeneous LTE and WiFi Edge Networks, published Nov. 2020 (Year: 2020).*

Yu, et al., "Painting on Placement: Forecasting Routing Congestion using Conditional Generative Adversarial Nets", 2019 56th ACM/IEEE Design Automation Conference (DAC), Jun. 2019, 6 pages, Las Vegas, NV, IEEE.

Valko, et al., "Finite-Time Analysis of Kernelised Contextual Bandits", UAI'13: Proceedings of the Twenty-Ninth Conference on Uncertainty in Artificial Intelligence, Aug. 2013, pp. 654-663, Bellevue, WA.

Foo, Kenneth, "Contextual Bandits: Linear Upper Confidence Bound Disjoint (LinUCB Disjoint) Algorithm", online: https://www.linkedin.com/pulse/contextual-bandits-linear-upper-confidence-bound-disjoint-kenneth-foo, May 4, 2020, 13 pages, Linkedin.

"Multi-Armed Bandit", online: https://en.wikipedia.org/wiki/Multi-armed_bandit, Jul. 5, 2021, 13 pages, Wikimedia Foundation, Inc.

Valko, et al., "Spectral Bandits for Smooth Graph Functions", Proceedings of the 31st International Conference on Machine Learning (ICML), JMLR: W&CP vol. 32, Jun. 2014, 9 pages, Beijing, China.

* cited by examiner

AVOIDING USER EXPERIENCE DISRUPTIONS USING CONTEXTUAL MULTI-ARMED BANDITS

TECHNICAL FIELD

The present disclosure relates generally to computer networks, and, more particularly, to avoiding user experience disruptions using contextual multi-armed bandits.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, testing has shown that simply relying on probing all available paths to an online application often does not reflect the true user experience with the application. Indeed, many online applications are too sophisticated for probing results to correctly reflect the actual user experience from the standpoint of their users. In addition, micro failures and other such conditions may not be captured through path probing, while still greatly affecting the user experience with the application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device uses a multi-armed bandit model to select different network paths over time via which traffic associated with an online application is routed. The device obtains, from a provider of the online application, application experience metrics associated with the different network paths and indicative of user satisfaction with the online application. The device learns, by the multi-armed bandit model, which of the different network paths will provide satisfactory application experience metrics, based on the application experience metrics associated with the different network paths. The device causes the traffic associated with the online application to be routed via a set of one or more paths expected by the multi-armed bandit model to provide satisfactory application experience metrics for the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
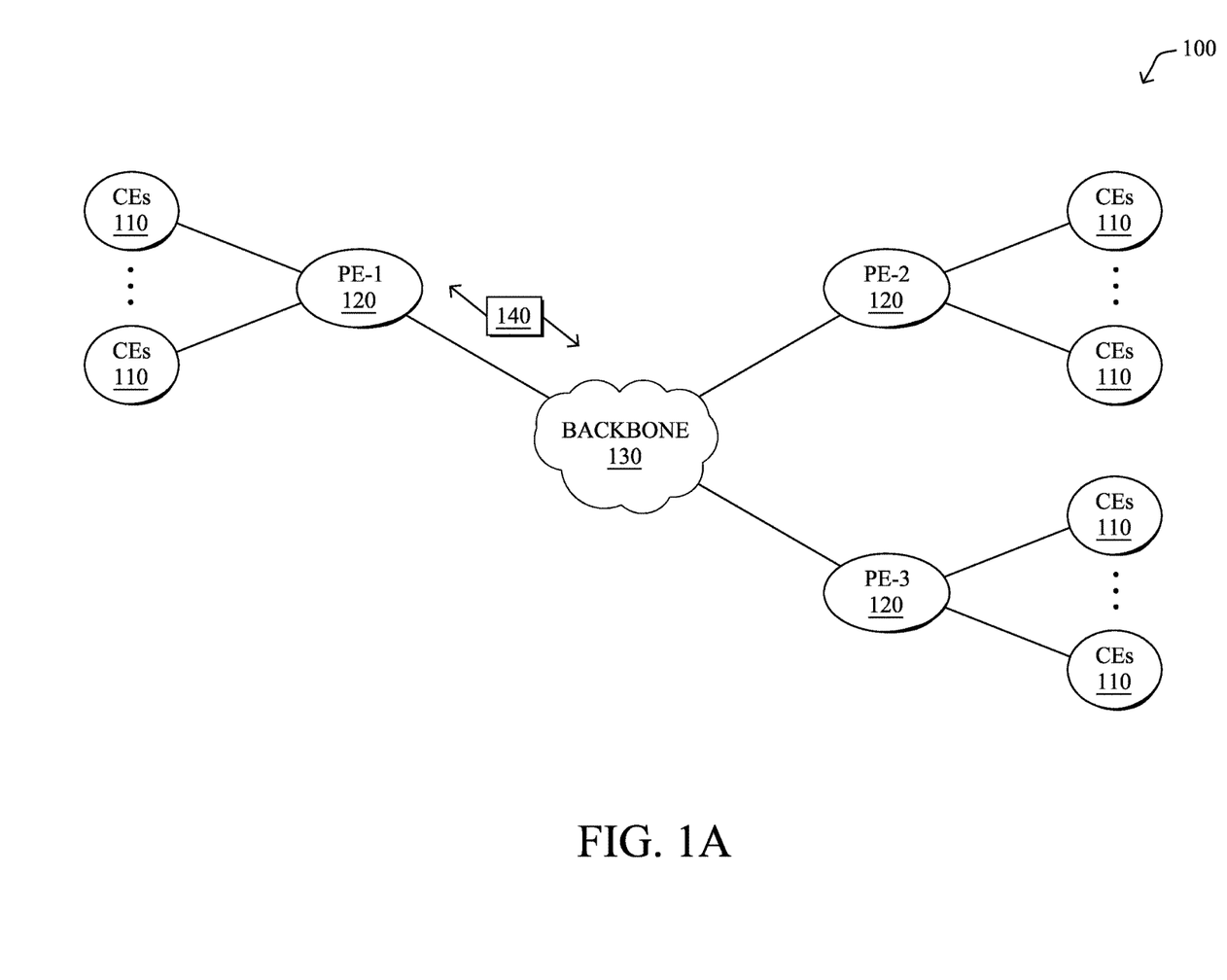
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
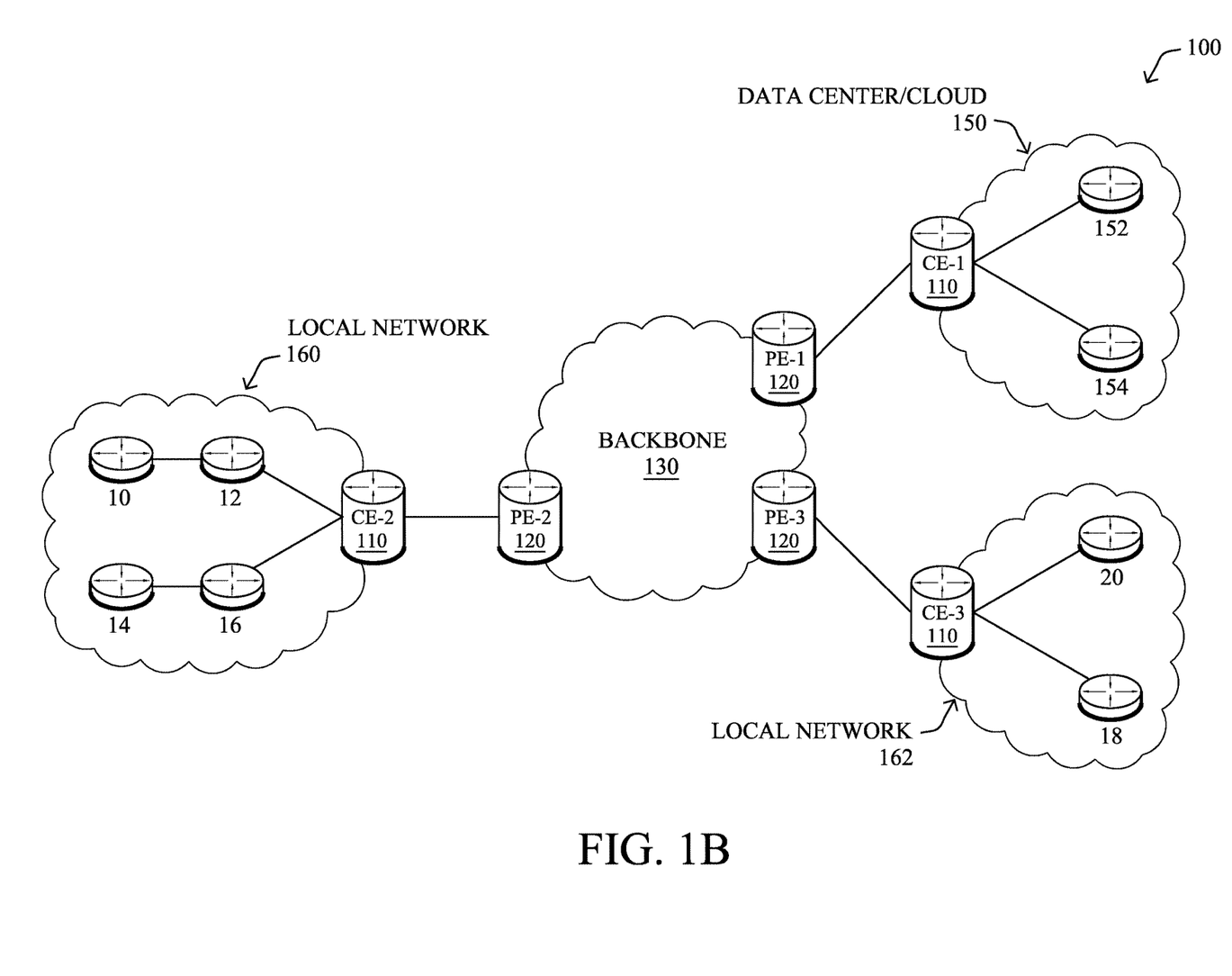

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
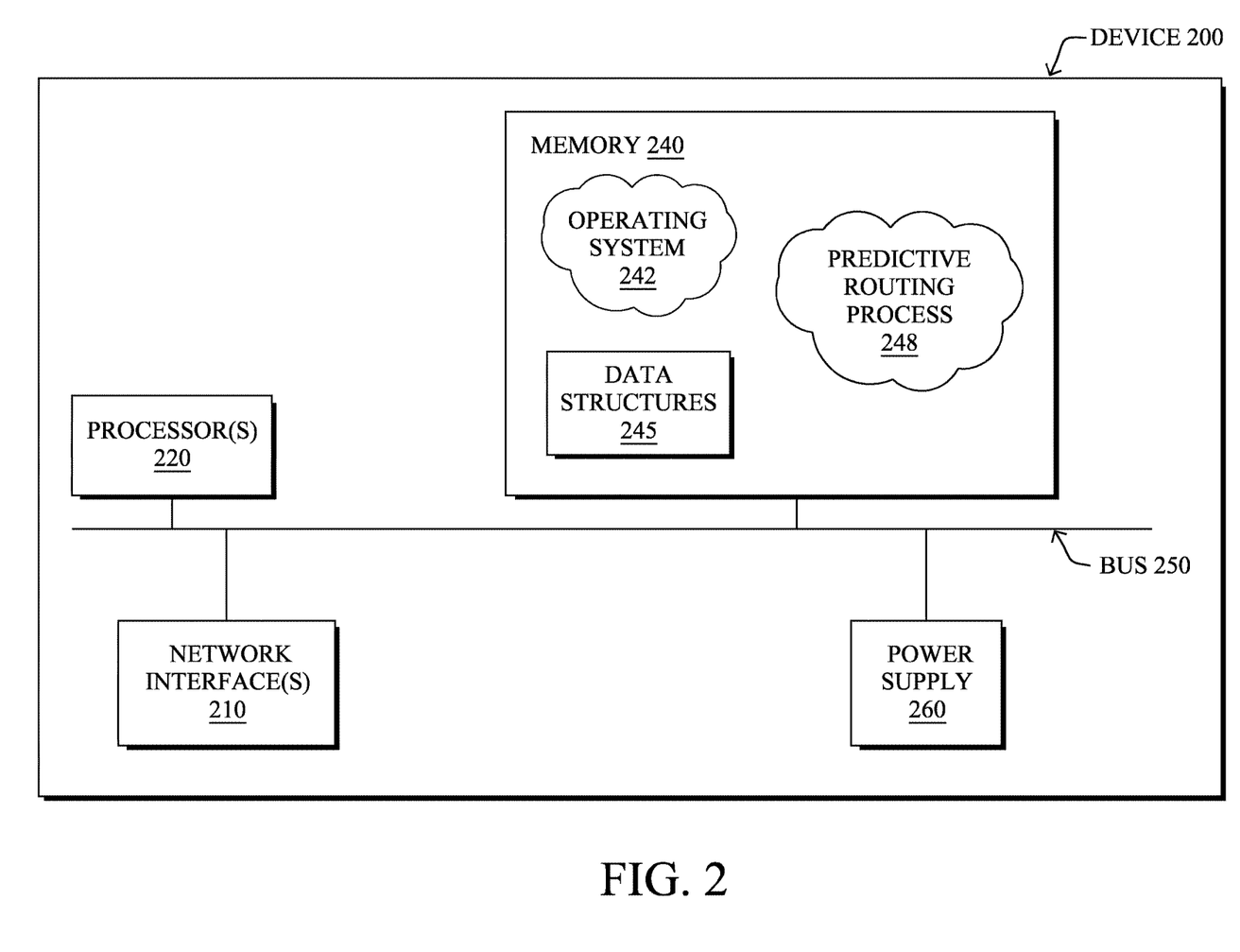
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
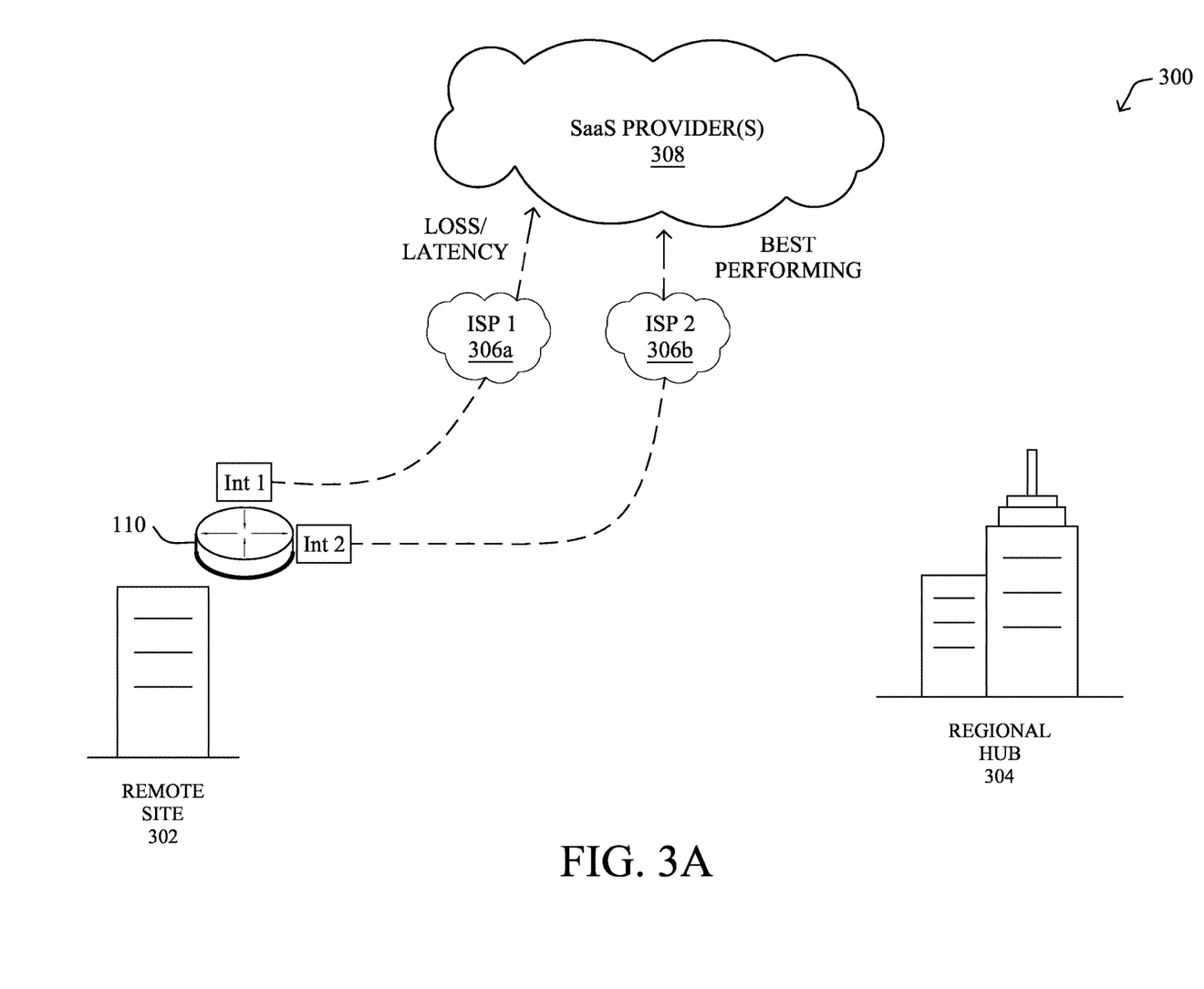
FIGS. 3A-3B illustrate example network deployments.
Figure 3B:
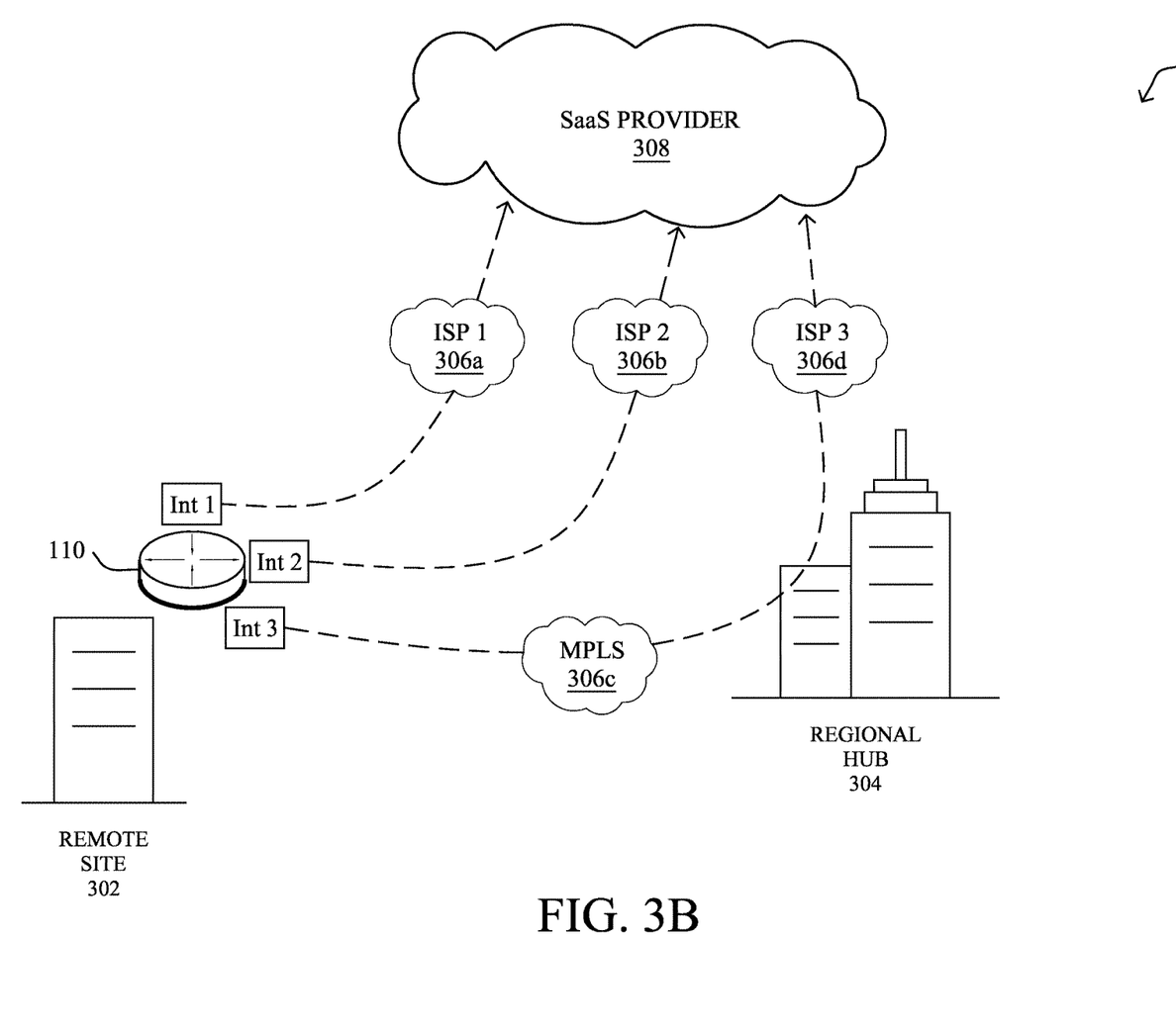

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
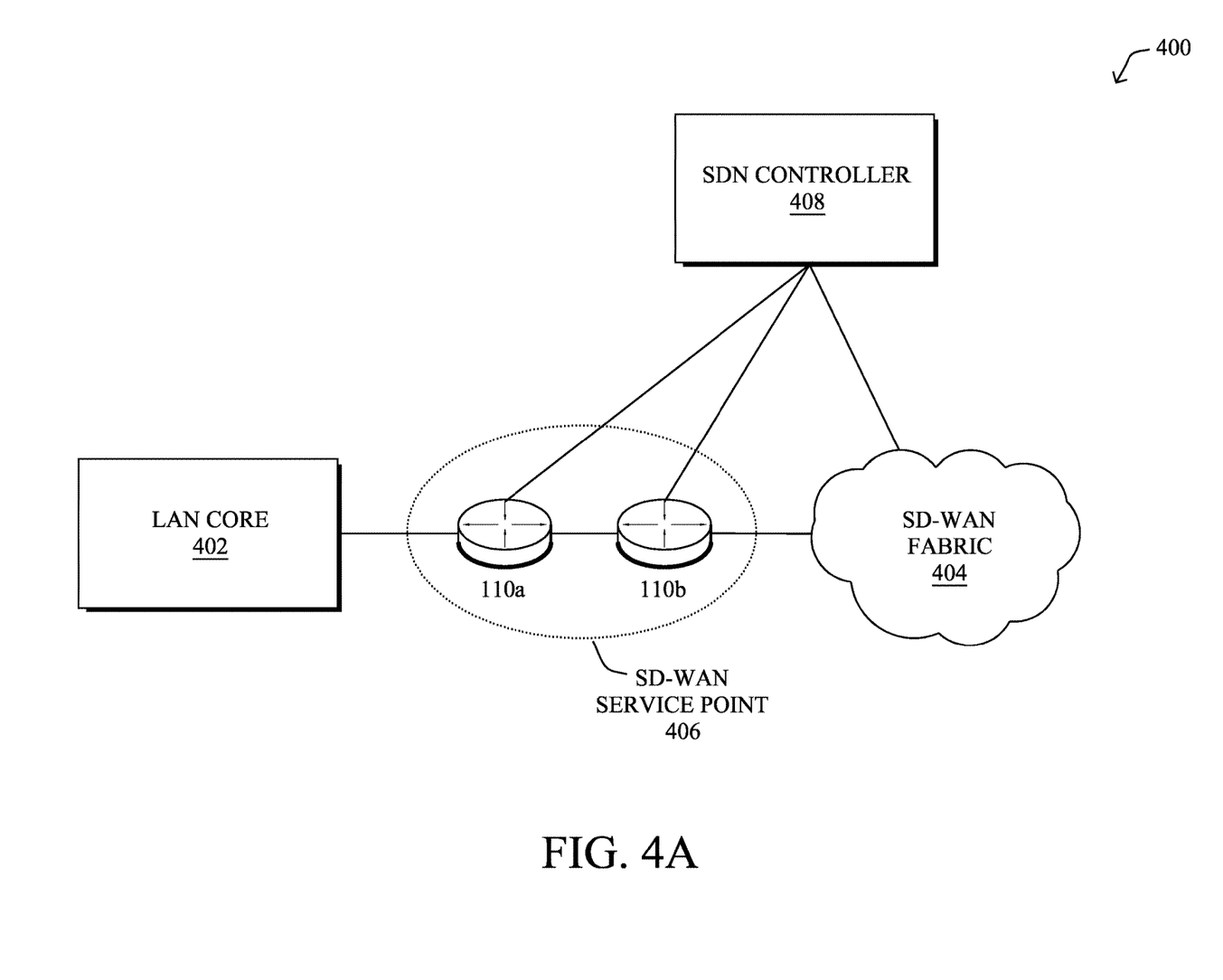
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast pith the notion of an informed decision,
SLA failures are very common in the Internet and a good proportion of them could be avoided (e.g., using an alternate path), if predicted in advance.

Figure 4B:
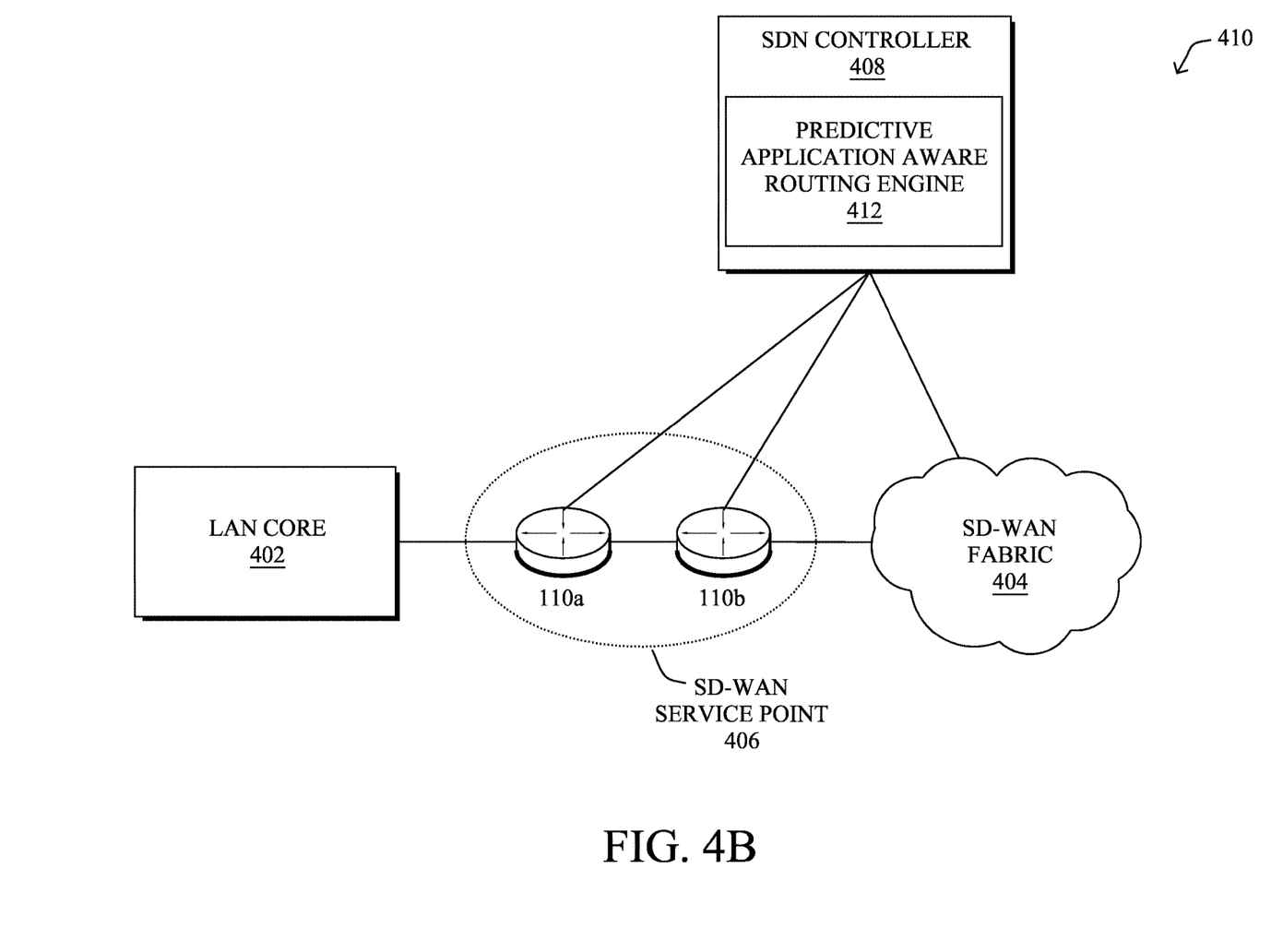

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictive routing can be used to avoid disruptions to the application traffic associated with an online application, such as a SaaS application. A simple solution consists in using dense probes: send probes to the destination going through various paths and compare the results. For instance, this can be done in point-to-point using the BFD protocol to estimate loss/latency/jitter over various tunnels. These probes are referred to herein as 'dense,' since these probes are sent over all existing paths.

In practice, dense probes usually do not reflect the real user experience. For instance, it is hard to generate dense probes reflecting the user experience for voice calls. By their very nature, probes are synthetic, and many SaaS applications are too sophisticated for probes to correctly capture actual user experience. Indeed, many SaaS applications are intentionally designed to be resilient to certain network conditions. Furthermore, the user experience may simply not be captured by networking probes at all (e.g., micro failures) or such probes may be used to capture network characteristic with too coarse granularity.

An alternative approach consists in observing real user application sessions and the corresponding user experience, which can be reported and quantified by either the user or the application. Unlike with dense probes, this approach is limited to observing the user experience over paths that are actually conveying user session traffic. Thus, no information would be available for paths that are not being used to convey the application traffic. This results in a chicken-and-egg problem: how can the system know whether an alternate path A' might exhibit fewer violations than the current path A, if there is not actual user session traffic sent over path A'?

In other words, only partial information is ever available to a predictive routing engine:
If the engine forecasts violations on path A and decides to move the traffic to path A', the engine may never know for sure whether path A would have failed as predicted, since the traffic was moved.
If the engine forecasts violations on path A and decides not to move the traffic to path A', the engine may never know for sure whether path A' would have resulted in fewer violations.

Avoiding User Experience Disruptions Using Contextual Multi-Armed Bandits

The techniques herein propose making a tradeoff between 'exploring' (e.g., taking uncertain decisions and seeing what the result is, to gain information) and 'exploiting' (e.g., taking known, good decisions, even if it means not learning any new information). In some aspects, the techniques herein may rely on reinforcement learning and multi-armed bandit models, to produce routing forecasts for a variety of application classes and SaaS services. This allows the system to avoid user experience disruptions using real user session experience metrics, as opposed to traditional dense, synthetic BFD probes. In addition, this allows a predictive routing engine to produce routing forecasts that are much more relevant, as they are based on real user experience for actual SaaS applications. In further aspects, information can also be shared between edge routers, to speed up the learning and automatically balance between exploration and exploitation.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device uses a multi-armed bandit model to select different network paths over time via which traffic associated with an online application is routed. The device obtains, from a provider of the online application, application experience metrics associated with the different network paths and indicative of user satisfaction with the online application. The device learns, by the multi-armed bandit model, which of the different network paths will provide satisfactory application experience metrics, based on the application experience metrics associated with the different network paths. The device causes the traffic associated with the online application to be routed via a set of one or more paths expected by the multi-armed bandit model to provide satisfactory application experience metrics for the online application.

Operationally, the techniques herein propose formalizing the tradeoff between exploring actions (e.g., taking uncertain decisions and seeing what the result is to gain information), and exploiting actions (e.g., taking known-good decisions, even if it means we are not learning any new information), for purposes of predictive routing. In some aspects, this can be formalized using contextual multi-armed bandit models (MABs).

In a MAB, it is assumed that, at every step, a decision must be made among K-number of potential options. In the traditional analogy with games of chance found in casinos, this is referred to as "drawing an arm." Once an arm has been picked, the payoff for that arm is revealed. If the bandit is stochastic, that payoff is drawn from a probability distribution associated to the arm. However, the payoff that would have been obtained by drawing a different arm is unknown, and MABs are thus partial information models: the system only learns about the value of the action it just took, not about that of the others.

Selecting a path or link to send traffic on for a time window can be seen as a MAB: the routing engine must decide to send traffic on one out of K paths, and can only observe the actual performance when the traffic is sent on the selected path. Thus, the routing engine does not know what the performance would have been, otherwise.

In practice, the best path to pick for a destination is not always fixed and will depend on context: the amount of traffic, seasonality and business patterns, user experience at other, related nodes, general network metrics, etc. Models that learn to find the best arm given the context are referred to as contextual MABs. For instance, structured variants of contextual MABs can take into account the fact that some of the arms have structure. Consider the following example:

Path A might include segments E→R1→R2→R3→D, where E is an edge router, and D the destination.

Path B might include segments E→R1→R4→D.

Although both paths can be evaluated independently, structured models can take into account the fact that they have the same first segment, and thus might have shared fate and/or similar performance in some contexts.

According to various embodiments, the techniques herein propose using MABs to select the best paths to avoid disruptions without resorting to dense probing, and potentially using user experience from users and applications in addition to network metrics. In various embodiments, the system can be used either in a distributed fashion where routers are fully in charge of the learning, or by using partial information sharing between routers. One of the key applications of such an approach applies to networks where (dense) probes are not available or either not precise or reliable enough.

Figure 5:
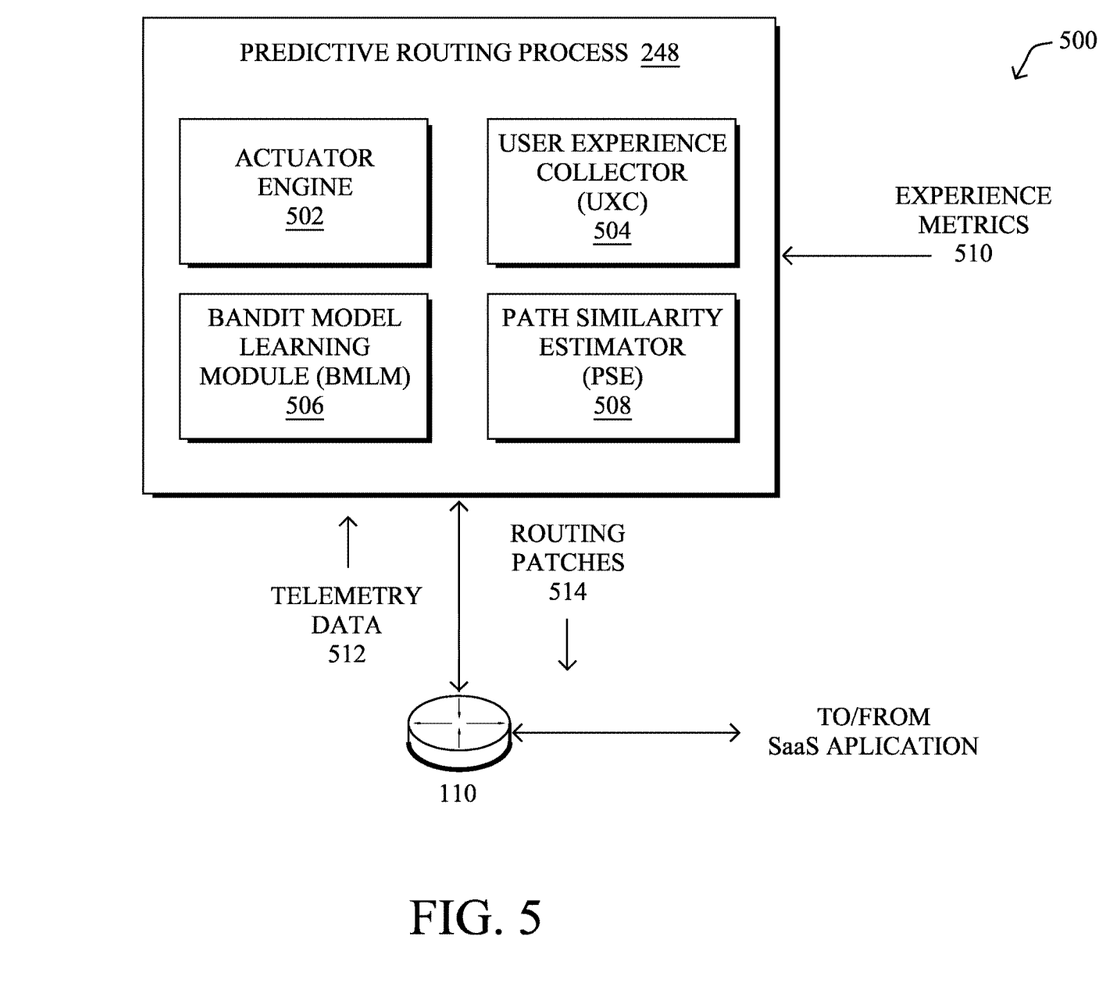
FIG. 5 illustrates an example architecture for using contextual multi-armed bandits to avoid user experience disruptions.

FIG. 5 illustrates an example architecture 500 for using contextual multi-armed bandits to avoid user experience disruptions, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like, to provide a supervisory service to the network.

As shown, predictive routing process 248 may include any or all of the following components: an actuator engine 502, a user experience collector (UXC) 504, a bandit model learning module (BMLM) 506, and/or a path similarity estimator (PSE) 508. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

During execution, actuator engine 502 is responsible for applying path selection decisions at the level of the routers. In some embodiments, actuator engine 502 may be implemented as part of an SD-WAN controller that sends routing patches to edge routers. For instance, actuator engine 502 may send routing patches 514 to router 110, to control how traffic for a particular online application is routed at any given time. Of course, in other embodiments, actuator engine 502 may be implemented directly on router 110. In this case, the learning functions of predictive routing process 248 may also be implemented directly on router 110 and the path selection decisions may be taken and applied, locally.

In one embodiment, actuator engine 502 can support not just the choice of a path for the traffic of a given application, but load-balancing of the application traffic between multiple paths. In practice, this can lead to complex network behavior. Accordingly, purposes of illustration, the techniques herein are described primarily from the standpoint of selecting a single 'best' path, although the techniques are equally applicable to select multiple paths.

Predictive routing process 248 may also include user experience collector (UXC) 504, which is configured to obtain user/application experience metrics 510 for a particular online application at the level of individual paths. For instance, UXC 504 may receive experience metrics 510 from a SaaS provider. In general, experience metrics 510 may be based on user satisfaction ratings specified by users of the online application. For example, a user of the application may specify on a scale of 1-10 their satisfaction with their user session. Note that experience metrics 510 may also be application specific: for voice, it may be a variation of concealment time (e.g., the time where a user is unable to hear/see other people), for a productivity application it may be a different measurement, etc.

In addition to experience metrics 510, UXC 504 may also collect telemetry data 512, such as from the various edge routers 110 or from other sources. In general, telemetry data 512 may include various path measurement, such as loss, latency, jitter, queue sizes, the amount of traffic of a given application, etc. In both cases, experience metrics 510 and telemetry data 512 may be collected on a per-path basis (e.g., UXC 504 may associate metrics to existing network paths or interfaces on the routers). In addition, if the application provider does not provide experience metrics 510 at a level fine enough (e.g., only at the level of prefixes and not paths), UXC 504 may estimate the path-level metrics, potentially by supplementing them using additional network metrics, such as path probing results.

In other words, UXC 504 may curate any or all of the following for each application and path:
   The target metric for the application. This is a summary of user experience in one number and may be maximized by the system through choosing the best path. This can be set by the system or customized by the user through application specific policies. For instance, the target metric can be based on:
      User experience ratings provided explicitly by users. These are usually categorical ratings (e.g., one to five stars). For instance, in the context of voice applications, such ratings can be elicited from the user at the end of the conversation.
      Implicit experience metrics, such as concealment time for audio or video. The concealment time captures the amount of time where a user was unable to hear or see other participants correctly. Such metrics are easier to obtain, as there is no need for explicit user feedback. Similarly, with SaaS applications such as Office 365, Salesforce, and others, implicit metrics can capture failed requests from the user or look for retries (e.g., user clicking on a button multiple times).
   Additional contextual metrics for the application—for instance, historical quantities about the system at that time of day, etc. In addition, BGP information for the path can be collected and transformed into features. This allows the context-dependent model to become more uncertain about a path if the routes to the SaaS going through that path have changed.

In the language of MABs, the target metric for the application can be considered the "payoff" for sending traffic on a given path: it captures the experience resulting from the routing decision. All the additional metrics may used to build a feature vector encoding context for the decision. The feature vector can then be used as the context for contextual MAB algorithms of bandit model learning module (BMLM) 506, described below.

BMLM 506 may leverage one or more multi-armed bandit models to select a path to use at any given time, in various embodiments. For each application and every T time units, such a model may select a path to use for either the next T time units, or some window of T time units in the future. The model can thus either produce a decision for right now, or for the future. In some embodiments, BMLM 506 may be instantiated for any or all supported applications, so as to learn separate models for each application, in order to better adapt to their characteristics and destinations.

Similar to the other components of predictive routing process 248, BMLM 506 may be executed either in a centralized manner (e.g., on an SD-WAN controller) or directly at the edge of the network. When running in a centralized manner, one BMLM 506 instance may also be run for each edge router in the network. BMLM 506 may further maintains local state about past routing decisions and corresponding results on the available paths for the router.

As would be appreciated, BMLM 506 cannot retain data forever. Thus, in some instances, BMLM 506 may employ forgetting whereby older data is aged out, both for computational reason as well as to adapt to changing payoff distributions. In other cases, older data may be reweighted to have less weight over time.

BMLM 506 may use various forms of MAB models, such as a Linear Upper Confidence Bound (LinUCB) model or the like. In this case, BMLM 506 may make its decisions based only on feedback from the router, such as router 110.

In another embodiment, BMLM 506 may use a graph contextual MAB algorithm and model, to leverage payoffs and action from other 'arms' on the same router as well as other routers: if a router A sends traffic over path P, but there is another similar path P' either from router A or from another router A', the payoff might be similar in both cases. As such, the payoff over P can be used as additional, partially reliable, information on path P', which speeds up the learning process. Algorithms such as SpectralUCB or KernelUCB can handle such scenarios and typically require a similarity function between paths.

In practice, BMLM 506 will not immediately observe the payoff after starting to apply the routing decision: only after T time unit will the user experience metrics 510 be available (or more if there is a delay to get user experience metrics from the SaaS vendor). This can require BMLM 506 to make a decision taking only into account all but the last payoff, which is easy to accommodate in practice.

Another potential component of predictive routing process 248 is path similarity estimator (PSE) 508, which is responsible for estimating the similarity function between paths based on past performance of the system as well as on path metrics, in various embodiments. In one embodiment, this may entail PSE 508 identifying paths where experience metrics are correlated. PSE 508 may also adjust the similarities based on whether the payoffs were indeed correlated. Typically, PSE 508 may be executed in a centralized manner.

By way of example, BMLM 506 may send information about decisions and payoffs to PSE 508, and PSE 508 may return to each router a list of past decisions and the corresponding payoffs, if they have changed. As for BMLM 506, PSE 508 may operate on a per-application basis, in order to capture the specificities of each application. In distributed mode, a central PSE 508 may send a message PSE_METRIC to the distributed BMLMs 506 on the edge routers, such as router 110.

The main function of PSE 508 is to estimate a similarity metric. The precise form of the metric will vary on the MAB algorithm used in BMLM 506 (e.g., it can expect a kernel function, a graph, etc.). For instance, PSE 508 may estimate a similarity matrix. If, for instance, there are K total paths in the network, the matrix may be a symmetric K×K matrix where the (i, j)-th entry indicates the similarity between the i-th and the j-th path. The diagonal of the matrix may also be left empty.

In one embodiment, PSE 508 may build time series for the payoffs at each path, and compute a correlation matrix between these time series. Paths whose payoffs (when we observe some) are correlated are likely to be similar, and the rewards in some of them can be leveraged to help learn about others. In another embodiment, networking expertise and/or additional metrics can be used. For instance, knowledge of the hops and segments composing each path can be used to build models, leveraging networking subject matter expertise.

Figure 6:
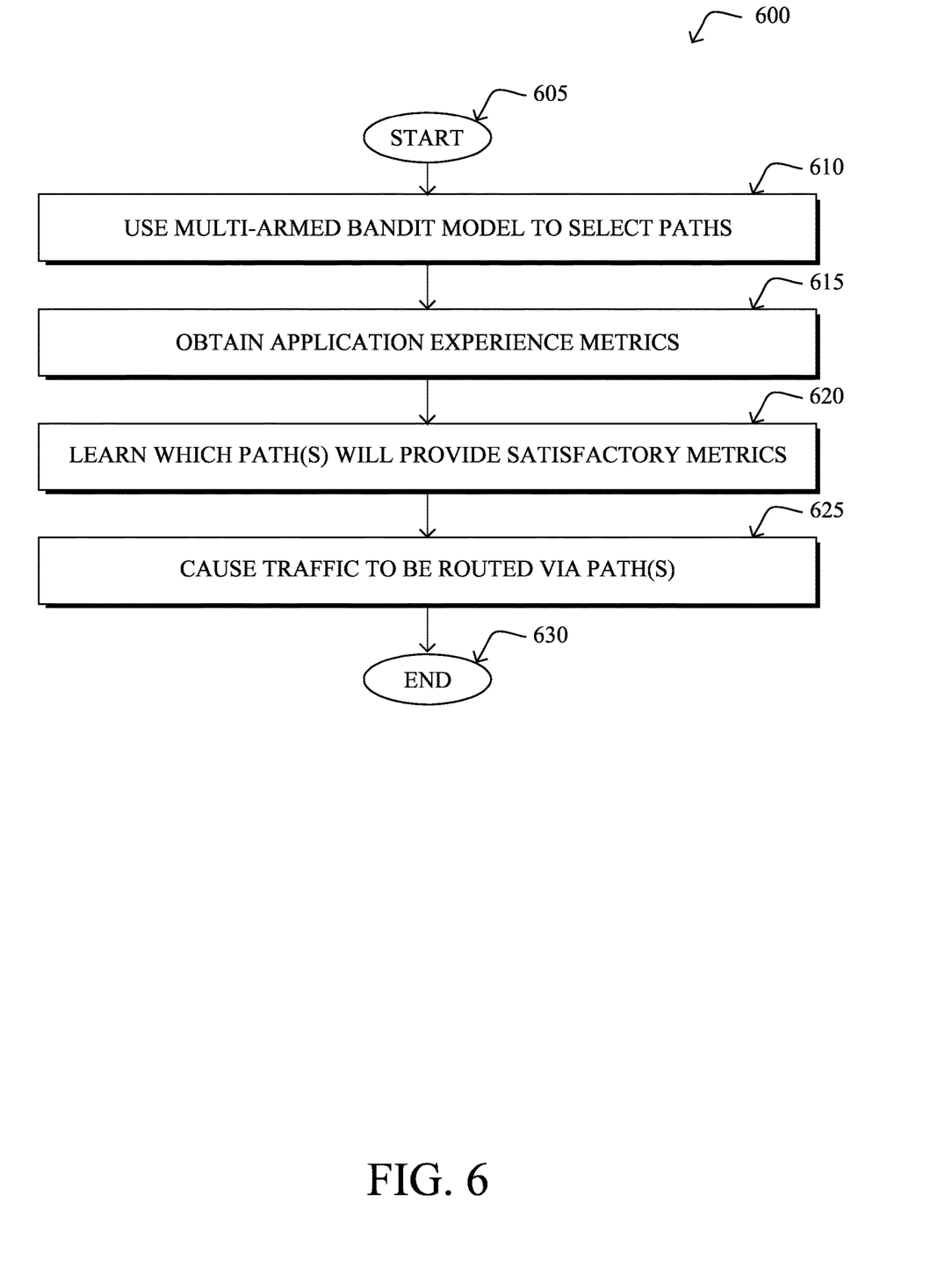
FIG. 6 illustrates an example simplified procedure for avoiding user experience disruptions for an online application.

FIG. 6 illustrates an example simplified procedure 600 (e.g., a method) for avoiding user experience disruptions for an online application, in accordance with one or more embodiments described herein. For example, a non-generic, specifically configured device (e.g., device 200), such as controller for a network (e.g., an SDN controller or other device in communication therewith), may perform procedure 600 by executing stored instructions (e.g., predictive routing process 248), to provide a supervisory service to a network. The procedure 600 may start at step 605, and continues to step 610, where, as described in greater detail above, the device may use a multi-armed bandit model to select different network paths over time via which traffic associated with an online application is routed. For instance, the device may select one of the different network paths to route traffic associated with the online application, based on that path not being used to route traffic associated with the online application within a certain amount of time, as part of an exploration mechanism. In some embodiments, the online application may be an SaaS application. In further embodiments, the device may be a controller for a software defined network, such as an SD-WAN controller, or may comprise an edge router.

At step 615, as detailed above, the device may obtain, from a provider of the online application, application experience metrics associated with the different network paths and indicative of user satisfaction with the online application. For instance, the application experience metrics may comprise user satisfaction ratings specified by users of the online application or other metrics indicative of the quality of experience with the application (e.g., a concealment time metric), etc.

At step 620 the device may learn, by the multi-armed bandit model, which of the different network paths will provide satisfactory application experience metrics, based on the application experience metrics associated with the different network paths, as described in greater detail above. In some embodiments, this may entail using the application experience metrics as payoffs for the multi-armed bandit model. In further embodiments, this learning may include identifying, based on the application experience metrics associated with the different network paths, similar paths from among the different network paths. In turn, the device may select the set of one or more paths, based in part on the similar paths.

At step 625, as detailed above, the device may cause the traffic associated with the online application to be routed via a set of one or more paths expected by the multi-armed bandit model to provide satisfactory application experience metrics for the online application. Here, the model may operate in an exploiting mode in which it selects path(s) that promise the best application experience (e.g., the best 'payoff'). Procedure 600 then ends at step 630.

It should be noted that while certain steps within procedure 600 may be optional as described above, the steps shown in FIG. 6 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

The techniques described herein, therefore, allow for a predictive routing engine to balance between routing application traffic across all available paths and only along those paths that promise acceptable application experience.

While there have been shown and described illustrative embodiments that provide for avoiding user experience disruptions using contextual multi-armed bandits, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   using, by a device, a multi-armed bandit model to select different network paths over time via which traffic associated with an online application is routed;
   obtaining, by the device, application experience metrics associated with the different network paths as previously selected by the multi-armed bandit model for use at a particular time, the application experience metrics indicative of user satisfaction with the online application over the particular time;
   learning, by the device and by the multi-armed bandit model, which of the different network paths will provide satisfactory application experience metrics, based on the application experience metrics associated with the different network paths as previously selected by the multi-armed bandit model being used as payoffs in the multi-armed bandit model for each of the different network paths, wherein similar paths are identified from among the different network paths for the multi-armed bandit model based on estimating a similarity function between the different network paths based on past performance of the application experience metrics and path metrics of the different network paths, and wherein the similarity function is adjusted based on the payoffs; and
   causing, by the device, the traffic associated with the online application to be routed via a set of one or more paths expected by the multi-armed bandit model to provide satisfactory application experience metrics for the online application based on the payoffs.

2. The method as in claim 1, wherein the online application is a software as a service (SaaS) application.

3. The method as in claim 1, wherein learning which of the different network paths will provide satisfactory application experience metrics comprises:
using the application experience metrics as payoffs for the multi-armed bandit model.

4. The method as in claim 1, wherein using the multi-armed bandit model to select the different network paths over time comprises:
selecting one of the different network paths to route traffic associated with the online application, based on that path not being used to route traffic associated with the online application within a certain amount of time.

5. The method as in claim 1, wherein the application experience metrics comprise user satisfaction ratings specified by users of the online application.

6. The method as in claim 1, further comprising:
augmenting the application experience metrics with path probing results.

7. The method as in claim 1, wherein the device comprises an edge router.

8. The method as in claim 1, wherein the device comprises a controller for a software-defined network.

9. An apparatus, comprising:
one or more network interfaces;
a processor coupled to the one or more network interfaces and configured to execute one or more processes; and
a memory configured to store a process that is executable by the processor, the process when executed configured to:
use a multi-armed bandit model to select different network paths over time via which traffic associated with an online application is routed;
obtain a device, application experience metrics associated with the different network paths as previously selected by the multi-armed bandit model for use at a particular time, the application experience metrics indicative of user satisfaction with the online application over the particular time;
learn, the multi-armed bandit model, which of the different network paths will provide satisfactory application experience metrics, based on the application experience metrics associated with the different network paths as previously selected by the multi-armed bandit model being used as payoffs in the multi-armed bandit model for each of the different network paths, wherein similar paths are identified from among the different network paths for the multi-armed bandit model based on estimating a similarity function between the different network paths based on past performance of the application experience metrics and path metrics of the different network paths, and wherein the similarity function is adjusted based on the payoffs; and
cause the traffic associated with the online application to be routed via a set of one or more paths expected by the multi-armed bandit model to provide satisfactory application experience metrics for the online application based on the payoffs.

10. The apparatus as in claim 9, wherein the online application is a software as a service (SaaS) application.

11. The apparatus as in claim 9, wherein the different network paths that will provide satisfactory application experience metrics are learned by the apparatus by:
using the application experience metrics as payoffs for the multi-armed bandit model.

12. The apparatus as in claim 9, wherein the apparatus uses the multi-armed bandit model to select the different network paths over time by:
selecting one of the different network paths to route traffic associated with the online application, based on that path not being used to route traffic associated with the online application within a certain amount of time.

13. The apparatus as in claim 9, wherein the application experience metrics comprise user satisfaction ratings specified by users of the online application.

14. The apparatus as in claim 9, wherein the process when executed is further configured to:
augment the application experience metrics with path probing results.

15. The apparatus as in claim 9, wherein the apparatus comprises an edge router or a controller for a software-defined network.

16. A tangible, non-transitory, computer-readable medium storing program instructions that cause a device to execute a process comprising:
using, by the device, a multi-armed bandit model to select different network paths over time via which traffic associated with an online application is routed;
obtaining, by the device, application experience metrics associated with the different network paths as past selected by the multi-armed bandit model for use at a particular time, the application experience metrics indicative of user satisfaction with the online application over the particular time;
learning, by the device and by the multi-armed bandit model, which of the different network paths will provide satisfactory application experience metrics, based on the application experience metrics associated with the different network paths as past selected by the multi-armed bandit model being used as payoffs in the multi-armed bandit model for each of the different network paths, wherein similar paths are identified from among the different network paths for the multi-armed bandit model based on estimating a similarity function between the different network paths based on past performance of the application experience metrics and path metrics of the different network paths, and wherein the similarity function is adjusted based on the payoffs; and
causing, by the device, the traffic associated with the online application to be routed via a set of one or more paths expected by the multi-armed bandit model to provide satisfactory application experience metrics for the online application based on the payoffs.

* * * * *